E. S. CHURCH.
FASTENER.
APPLICATION FILED MAY 31, 1918.
1,298,892.
Patented Apr. 1, 1919.
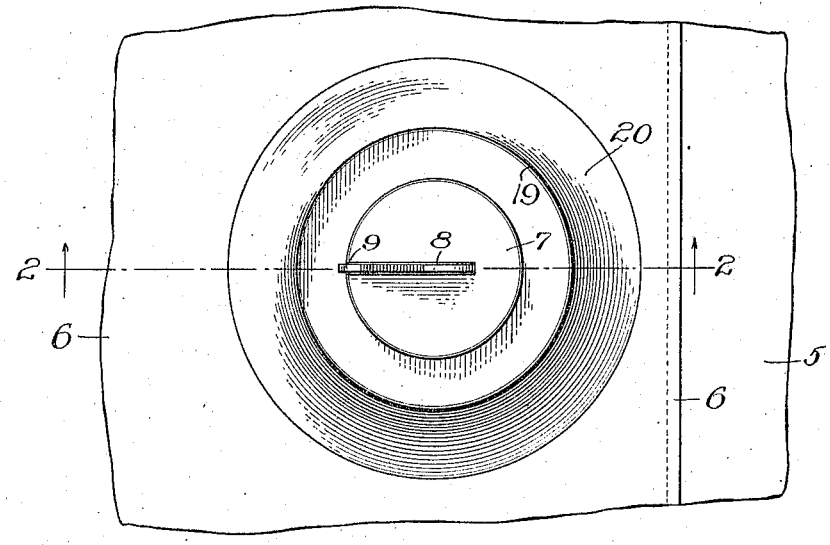
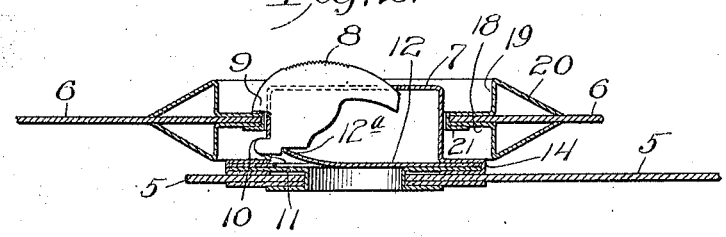
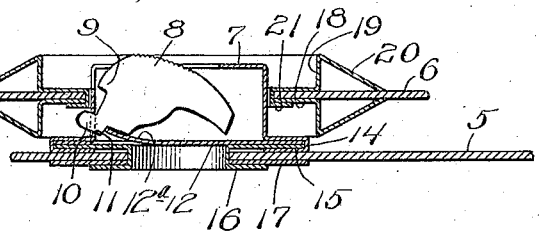
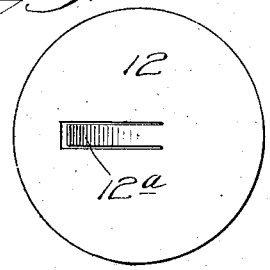
Inventor:
Edmund S. Church
by Fred Gerlach
Atty.

UNITED STATES PATENT OFFICE.

EDMUND S. CHURCH, OF CHICAGO, ILLINOIS, ASSIGNOR TO AUTOMATIC CARBURETOR COMPANY, OF CHICAGO, ILLINOIS, A CORPORATION OF ILLINOIS.

FASTENER.

1,298,892.  Specification of Letters Patent.  Patented Apr. 1, 1919.

Application filed May 31, 1918. Serial No. 237,453.

*To all whom it may concern:*

Be it known that I, EDMUND S. CHURCH, a citizen of the United States, and a resident of Chicago, in the county of Cook and State of Illinois, have invented certain new and useful Improvements in Fasteners, of which the following is a full, clear, and exact description.

The invention relates to stud and socket fasteners such as are adapted for gloves, belts or flexible parts.

The object of the invention is to provide an improved fastener whereby the socket will be positively locked on the stud and which permits convenient release of the socket by finger pressure applied in disconnecting one of the connected parts from the other. Another object of the invention is to provide an improved fastener of this type which is particularly adapted for application to gloves, belts, etc. A further object of the invention is to provide an improved fastener of this type which is simple in construction and can be produced at a low cost.

The invention consists in the several novel features hereinafter set forth and more particularly defined by claims at the conclusion hereof.

In the drawings: Figure 1 is a face view upon an enlarged scale of a device embodying the invention. Fig. 2 is a section taken on line 2—2 of Fig. 1, showing the latch in operative position. Fig. 3 is a similar view showing the latch in position assumed when it has been operated to release the socket. Fig. 4 is a detail plan of latch spring and retaining plate.

The invention is shown as applied to a glove comprising a portion 5 to which the stud is secured and a portion 6 to which the socket is secured. A hollow stud 7 has a latch plate 8 movably held therein and this plate is provided with a stop portion 9 adapted to project from the periphery of the stud and into position to hold a socket on the stud. The outer end of the latch plate 8 projects beyond the outer end of the stud forming a grip whereby it can be manipulated laterally and inwardly into inoperative position as indicated in Fig. 3. The latch-plate 8 is provided with a lug or tongue 10 which extends into a hole 11 formed in the periphery of and near the base of the hollow stud. A leaf spring 12ª is adapted to normally hold the latch plate in projecting or operative position. The stud is adapted to be formed of sheet metal and a bottom plate 12, which has a portion thereof cut to form spring 12ª, closes the base of the stud. The latter is flanged, as at 14, and lapped around the margin of plate 12 and the flat portion 15 of a tubular rivet 16, which is adapted, by means of a washer 17, to clamp the glove portion 5 securely on the base of the stud.

The improved socket comprises members applied to the opposite sides of the glove portion 16 respectively and formed of sheet metal. Each comprises a flat central portion 18, an outwardly extending annular portion 19 and a conoidal marginal portion 20. The glove portion 6 is secured between these socket members by lapping the portion 18 of one member around the portion 18 of the other member, as shown at 21. The purpose of forming the socket members with outstanding portions 19 and conoidal portions 20 is to provide a space for the body and base of the stud so that there will be no excessive projection of the latch-plate 8. To release the socket, it is only necessary to press the latch-plate so the lock 9 will move into the stud, as shown in Fig. 3, when the socket will be free to be pulled off the stud. Upon release of the latch, the spring 12 will restore it to operative position, so that when the socket is forced onto the stud, it will force the latch laterally against the force of spring 12. When the socket passes inwardly of the projection 9 on the latch, it will pass into operative position.

The device in its entirety can be formed of sheet metal and be produced at a low cost. It is simple in construction and the latch 8 operates as a positive lock for the socket.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fastener, the combination of a hollow stud having a transverse slot at its outer end, a latch movably sustained in and having its body inclosed by the hollow stud, having a portion extending through said slot and projecting from said stud to hold a socket, a hollow rivet secured to the base of the stud and secured to a part to be fastened, and a socket on another part to be fastened adapted to pass around said stud.

2. In a fastener, the combination of a hollow stud having a transverse slot at its outer end, a latch movably sustained in the hollow stud having a portion extending through said slot and projecting from said stud to hold a socket, a base plate secured to the stud, a hollow rivet secured to the base of the stud and secured to a part to be fastened, and a bottom plate having a struck-up portion forming a spring to hold the latch.

3. In a fastener, the combination of a hollow stud having a transverse slot at its outer end, a latch movably sustained in the hollow stud, having a portion extending through said slot and projecting from said stud to hold a socket on the stud, the stud being provided with an opening in its periphery, a guide lug on the latch extending into said opening, a spring in the stud for normally holding the latch in operative position and a socket held around said stud.

4. In a fastener, the combination of a hollow stud, having a transverse slot at its outer end, a latch movably sustained in the hollow stud, having a portion extending through said slot and projecting from said stud to hold a socket on the stud, the stud being provided with an opening in its periphery and near its base, a lug on the latch extending into said opening, a spring in the stud for normally holding the latch in operative position and a socket held around said stud.

5. In a curtain fastener, the combination of a hollow stud having a transverse slot at its outer end, a latch movably sustained in the hollow stud, means on the stud for securing it to a part to be fastened, and a socket adapted to be held on the stud, comprising a member having a flat portion between which a part to be held is clamped, an outwardly extending portion forming a pocket around the stud and an inwardly inclined tapering marginal portion.

6. In a curtain fastener, the combination of a hollow stud having a transverse slot at its outer end, a latch movably sustained in the hollow stud, means on the stud for securing it to a part to be fastened, and a socket adapted to be held on the stud, comprising a pair of members each having a flat portion between which a portion to be held is clamped, an outwardly extending portion forming a pocket around the stud and an inwardly inclined tapering marginal portion.

EDMUND S. CHURCH.

Copies of this patent may be obtained for five cents each, by addressing the "Commissioner of Patents, Washington, D. C."